(12) United States Patent
Valin et al.

(10) Patent No.: US 11,924,367 B1
(45) Date of Patent: Mar. 5, 2024

(54) JOINT NOISE AND ECHO SUPPRESSION FOR TWO-WAY AUDIO COMMUNICATION ENHANCEMENT

(71) Applicant: Amazon Technologies, Inc., Seattle, WA (US)

(72) Inventors: Jean-Marc Valin, Montreal (CA); Karim Helwani, Mountain View, CA (US); Srikanth Venkata Tenneti, Sunnyvale, CA (US); Erfan Soltanmohammadi, Silver Spring, MD (US); Mehmet Umut Isik, Menlo Park, CA (US); Richard Newman, Pullman, WA (US); Michael Mark Goodwin, Scotts Valley, CA (US); Arvindh Krishnaswamy, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/668,297

(22) Filed: Feb. 9, 2022

(51) Int. Cl.
| | |
|---|---|
| *H04M 3/00* | (2006.01) |
| *G10L 21/0232* | (2013.01) |
| *G10L 21/034* | (2013.01) |
| *G10L 25/18* | (2013.01) |
| *H04S 3/00* | (2006.01) |
| *G10L 21/0208* | (2013.01) |

(52) U.S. Cl.
CPC ......... *H04M 3/002* (2013.01); *G10L 21/0232* (2013.01); *G10L 21/034* (2013.01); *G10L 25/18* (2013.01); *H04S 3/008* (2013.01); *G10L 2021/02082* (2013.01); *H04S 2400/01* (2013.01); *H04S 2400/03* (2013.01)

(58) Field of Classification Search
CPC ..... H04M 3/002; H04M 3/00; G10L 21/0232; G10L 21/034; G10L 25/18; G10L 25/30; H04S 3/008; G06F 3/165
See application file for complete search history.

(56) References Cited

U.S. PATENT DOCUMENTS

| | | | |
|---|---|---|---|
| 7,027,591 B2 | 4/2006 | Cairns | |
| 8,416,946 B2 | 4/2013 | Chhetri et al. | |
| 10,904,396 B2* | 1/2021 | Hera | H04M 9/082 |
| 11,521,637 B1 | 12/2022 | Valin et al. | |
| 2018/0115824 A1 | 4/2018 | Cassidy | |
| 2019/0318755 A1* | 10/2019 | Tashev | G06N 3/045 |
| 2020/0066296 A1* | 2/2020 | Sargsyan | G10L 21/0232 |

(Continued)

OTHER PUBLICATIONS

U.S. Appl. No. 17/037,498, filed Sep. 29, 2020, Jean-Marc Valin et al.

(Continued)

*Primary Examiner* — Yosef K Laekemariam
(74) *Attorney, Agent, or Firm* — S. Scott Foster; Kowert, Hood, Munyon, Rankin & Goetzel, P.C.

(57) ABSTRACT

Joint noise and echo suppression may be performed for enhancing two-way audio communications. Audio data is captured at a communication device and audio data transmitted to the communication device from another communication device are used as input features to a trained machine learning model that uses the transmitted audio data as a reference signal to eliminate residual echo in the captured audio data when also suppressing noise in the captured audio data.

20 Claims, 7 Drawing Sheets

(56) References Cited

U.S. PATENT DOCUMENTS

| | | |
|---|---|---|
| 2020/0152179 A1 | 5/2020 | Van Hout |
| 2021/0125625 A1 | 4/2021 | Huang |
| 2022/0335953 A1 | 10/2022 | Rikhye |

OTHER PUBLICATIONS

U.S. Appl. No. 17/364,805, filed Jun. 30, 2021, Ritwik Giri, et al.

Jean-Marc Valin, et al., "A Perceptually-Motivated Approach for Low-Complexity, Rea-Time Enhancement of Fullband Speech", arXiv:2008.04259v2, Aug. 27, 2020, pp. 1-5.

Yi Luo, "TASNET: Time-Domain Audio Separation Network for Real-Time, Single-Channel Speech Separation", arXiv:1711.00541v2, Apr. 8, 2018, pp. 1-5.

John R. Hershey, et al., "Deep clustering: Discriminative embeddings for segmentation and separation", arXiv:1508.04306v1, Aug. 18, 2015, pp. 1-10.

Morten Holbaek, et al., "Multi-talker Speech Separation with Utterance-level Permutation Invariant Trainingof Deep Recurrent Neural Networks", arXiv:1703.06284v2, Jul. 11, 2017, pp. 1-12.

Yi Luo, et al., "Conv-TasNet: Surpassing Ideal Time-Frequency Magnitude Masking for Speech Separation", IEEE/ACM Transactions on Audio, Speech and Language Processing, vol. 27, No. 8, Aug. 2019, pp. 1256-1266.

Efthymios Tzinis, et al., "Unsupervised Deep Clustering for Source Separation: Direct Learning From Mixtures Using Spatial Informaiton", arXiv:1811.01531v2, Nov. 9, 2018, pp. 1-5.

Thilo von Neumann, et al., "All-Neural Online Source Separation, Counting, and Diarization for Meeting Analysis", arXiv:1902.07881v1, Feb. 21, 2019, pp. 1-5.

Desh Raj, et al., "Integration of Speech Separation, Diarization, and Recognition for Multi-Speaker Meetings: System Description, Comparison, and Anaylsis", arXiv:2011.02014v1, Nov. 3, 2020, pp. 1-8.

Quan Wang, et al., "VoiceFilter: Targeted Voice Separation by Speaker-Conditioned Spectrogram Masking", arXiv:1810.04826v6, Jun. 19, 2019, pp. 1-5.

Lin Wan, et al., "Generalized End-to-End Loss for Speaker Verification", arXiv:1710.10467v5, Nov. 9, 2020, pp. 1-5.

Seongkyu Mun, et al. "The Sound of My Voice: Speaker Representation Loss for Target Voice Separation", arXiv:1911.02411v2, Feb. 27, 2020, pp. 1-5.

Rongzhi Gu, et al., "Neural Spatial Filter: Target Speaker Speech Separation Assisted with Directional Information", Interspeech 2019, Sep. 15-19, 2019, Graz, Austria, pp. 1-5.

Tingle Li, et al., "Atss-Net: Target Speaker Separation via Attention-based Neural Network", arXiv:2005.09200v1, May 19, 2020, pp. 1-5.

Xiong Xiao, et al., "Speech Separation Using Speaker Inventory", IEEE, ASRU 2019, pp. 230-236.

Quan Wang, et al., "VoiceFilter-Lite: Streaming Targeted Voice Separation for On-Device Speech Recognition", arXiv:2009.04323v1, Sep. 9, 2020, pp. 1-5.

Chandan K. A. Reddy, et al., "The Interspeech 2020 Deep Noise Suppression Challenge: Datasets, Subjective Speech Quality and Testing Framework", arXiv preprint arXiv:2001.08662, 2020, pp. 1-5.

Aonan Zhang, et al., "Fully Supervised Speaker Diarization", arXiv:1810.04719v7, Feb. 19, 2019, pp. 1-5.

Quan Wang, et al., "Speaker Diarization With LSTM", arXiv:1710.10468v6, Dec. 14, 2018, pp. 1-5.

Ye Jia, et al., "Transfer Learning from Speaker Verification to Multispeaker Text-To-Speech Synthesis", arXiv:1806.04558v4, Jan. 2, 2019, pp. 1-15.

Kaizhi Qian, et al., "AutoVC: Zero-Shot Voice Style Transfer with Only Autoencoder Loss", in Proceedings of the 36th International Conference on Machine Learning, PLMR 97, 2019, pp. 1-10.

Jean-Marc Valin, et al., "LPCNET: Improving Neural Speech Synthesis Through Linear Prediction", arXiv:1810.11846v2, Feb. 19, 2019, pp. 1-5.

Sebastian Braun, et al., "Data augmentation and loss normalization for deep noise suppression", arXiv:2008.06412v2, Sep. 24, 2020, pp. 1-8.

Shaojin Ding, et al., "Personal VAD: Speaker-Conditioned Voice Activity Detection", arXiv:1908.04284v4, Apr. 8, 2020, pp. 1-7.

Joon Son Chung, et al., "VoxCeleb2: Deep Speaker Recognition", arXiv:1806.05622v2, Jun. 27, 2018, pp. 1-6.

Arsha Nagrani, et al., "VoxCeleb: a large-scale speaker identification dataset", arXiv:1706.08612v2, May 30, 2018, pp. 1-6.

Vassil Panayotov, et al., "Librispeech: An ASR Corpus Based on Public Domain Audio Books", 2015 IEEE international conference on acoustics, speech and signal processing (ICASSP). IEEE, 2015, pp. 1-5.

Umut Isik, et al., "PoCoNet: Better Speech Enhancement with Frequency-Positional Embeddings, Semi-Supervised Conversational Data, and Biased Loss", arXiv:2008-04470v1, Aug. 11, 2020, pp. 1-5.

Joachim Thiemann, et al., "Demand: a collection of multi-channel recordings of acoustic noise in diverse environments", Version 1.0, Jun. 9, 2013, In Proceedings Meetings Acoustic, pp. 1-6.

Ding Liu, et al., "Experiments on Deep Learning for Speech Denoising", In Proceedings of Fifteenth Annual Conference of the International Speech Communication Association, 2014, pp. 1-5.

Yong Xu, et al., "A Regression Approach to Speech Enhancement Based on Deep Neural Networks", IEEE/ACM Transactions on Audio, Speech, and Language Processing, vol. 23, No. 1, Jan. 2015, pp. 7-19.

Ke Tan, et al., "A Convolutional Recurrent Neural Network for Real-Time Speech Enchancement", Interspeech 2018, Sep. 2-6, 2018, pp. 1-5.

Arun Narayanan, et al., "Ideal Ratio Mask Estimation Using Deep Neural Networks for Robust Speech Recognition", IEEE, In Proceedings of International Conference on Acoustics, Speech and Signal Processing (ICASSP), 2013, pp. 7092-7096.

Yan Zhao, et al., "DNN-Based Enhancement of Noisy and Reverberant Speech", IEEE, In Proceedings of International Conference on Acoustics, Speech and Signal Processing (ICASSP), 2016, pp. 6525-6529.

Donald S. Williamson, et al., "Complex Ratio Masking for Monaural Speech Separation", IEEE/ACM Transactions on Audio Speech Language Processing, 24(3), Mar. 2016, pp. 483-492.

Santiago Pascual, et al., "SEGAN: Speech Enhancement Generative Adversarial Network", arXiv:1703.09452v3, Jun. 9, 2017, pp. 1-5.

Dario Rethage, et al., "A Wavenet for Speech Denoising", arXiv:1706.07162v3, Jan. 31, 2018, pp. 1-11.

Craig MaCartney, et al., "Improved Speech Enhancement with the Wave-U-Net", arXiv:1811.11307v1, Nov. 27, 2018, pp. 1-5.

Jean-Marc Valin, "A Hybrid DSP/Deep Learning Approach to Real-Time Full-Band Speech Enhancement", arXiv:1709.08243v3, May 31, 2018, pp. 1-5.

John P. Princen, et al., "Analysis/Synthesis Filter Bank Design Based on Time Domain Aliasing Cancellation", IEEE Transactions on Acoustics, Speech, and Signal Processing, vol. ASSP-34, No. 5, Oct. 1986, pp. 1153-1161.

Hedwig Gockel, et al., "Asymmetry of masking between complex tones and noise: Partial loudness", The Journal of the Acoustical Society of America, 114(1), Jul. 2003, pp. 349-360.

D. Talkin. A robust algorithm for pitch tracking (RAPT). In Speech Coding and Synthesis, chapter 14, Elsevier Science, 1995, pp. 495; 497-518.

Ted Painter, et al., "Perceptual Coding of Digital Audio", in Proceedings of the IEEE, vol. 88, No. 4, Apr. 2000, pp. 451-513.

Kyunghyun Cho, et al., "On the Properties of Neural Machine Translation: Encoder-Decorder Approaches", arXiv:1409.1259v2, Oct. 7, 2014, pp. 1-9.

Yan Zhao, et al., "Late Reverberation Suppression Using Recurrent Neural Networks With Long Short-Term Memory", In Proceedings of International Conference on Acoustics, Speech and Signal Processing (ICASSP), IEEE, 2018, pp. 5434-5438.

Hakan Erdogan, et al., "Investiagtions on Data Augmentation and Loss Functions for Deep Learning Based Speech-Background Separation", Interspeech 2018, Sep. 2-6, 2018, pp. 1-5.

(56) References Cited

OTHER PUBLICATIONS

Juin-Hwey Chen, et al., "Adaptive Postfiltering for Quality Enhancement of Coded Speech", in IEEE Transactions on Speech and Audio Processing, vol. 3, No. 1, Jan. 1995, pp. 59-71.
Valentini Botinhao, et al., "Investigating RNN-based speech enhancement methods for noise-robust Text-to-Speech", In Proceedings of ISCA Speech Synthesis Workshop (SSW), 2016, pp. 146-152.
Yangyang Xia, et al., Weighted Speech Distortion Losses for Neural-Network-Based Real-Time Speech Enhancement, arXiv:2001.10601v2. Feb. 12, 2020, pp. 1-5.

\* cited by examiner

JOINT NOISE AND ECHO SUPPRESSION FOR TWO-WAY AUDIO COMMUNICATION ENHANCEMENT

BACKGROUND

Over the past few years, audio enhancement methods (e.g., for recorded human speech) based on deep learning have greatly surpassed traditional methods based on spectral subtraction and spectral estimation. Many of these new techniques operate directly in the short-time Fourier transform (STFT) domain, resulting in a high computational complexity.

Figure 1:
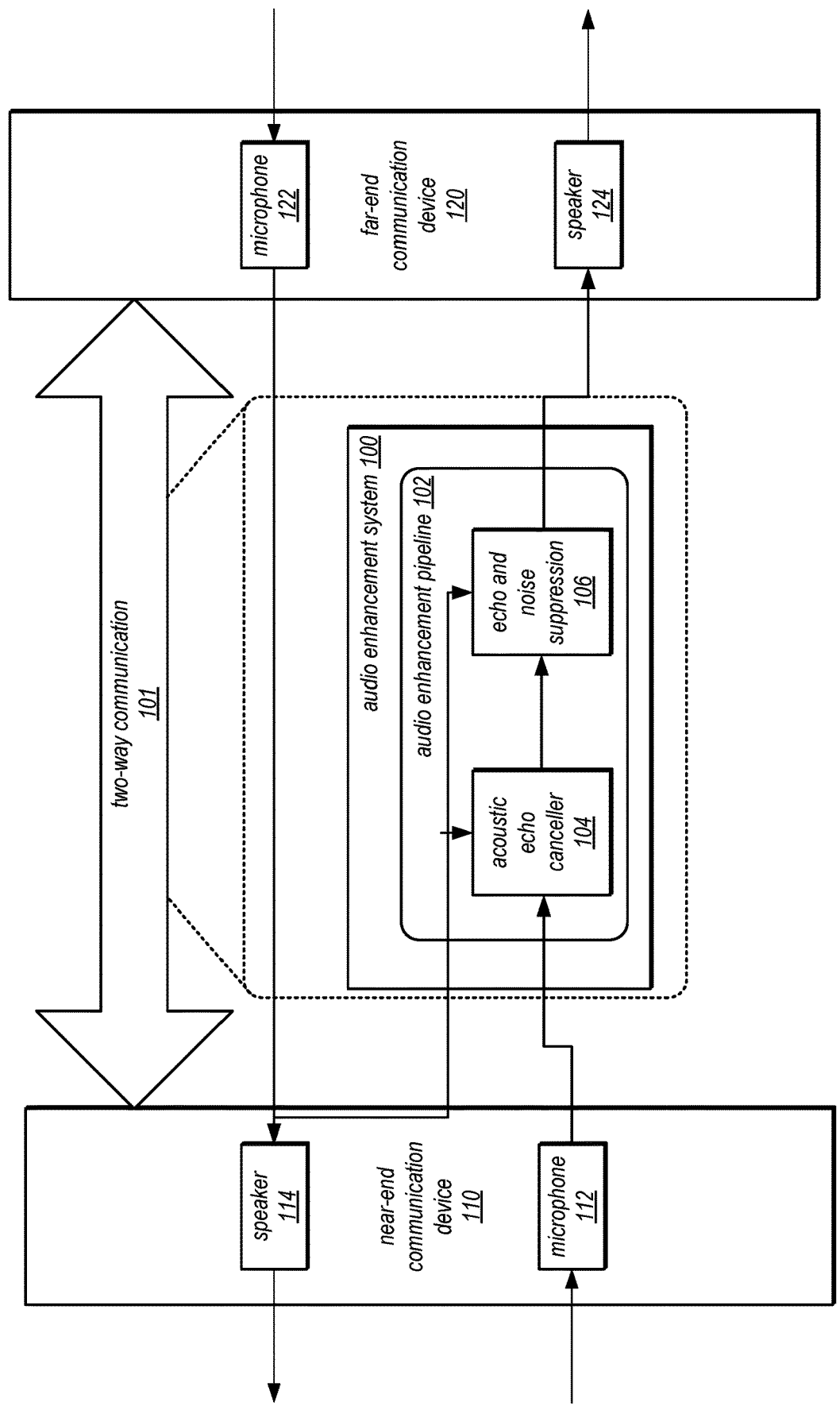
FIG. 1 illustrates a logical block diagram of joint noise and echo suppression for two-way audio communication enhancement, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for joint noise and echo suppression for two-way audio communication enhancement are described herein. In full-duplex communication applications, echo produced by the acoustic feedback from the loudspeaker to the microphone can severely degrade quality. Traditional acoustic echo cancellation (AEC) aims at cancelling the acoustic echoes from the microphone signal by filtering the far-end (loudspeaker) signal with the estimated echo path modeled by an adaptive FIR filter, and subtracting the resulting signal from the microphone signal. If the estimated echo path is equal to the true echo path, echo is removed from the microphone signal. In real-world applications, residual echo remains at the output of AEC due to issues such as non-linearities in the acoustic drivers, rapidly-varying acoustic environments, and microphone noise. Hence, residual echo suppressors are typically employed after the system identification-based AEC in order to meet the requirements for high echo attenuation In addition, background noise also degrades the speech quality, while limiting the ability of the AEC to adapt fast enough to track acoustic path changes, further worsening the overall communication quality. Traditional speech enhancement methods—sometimes combined with acoustic echo suppression—can help reduce the effect of stationary noise, but have been mostly unable to remove highly non-stationary noise. In recent years, deep-learning-based speech enhancement systems have emerged as state-of-the-art solutions. Even more recently, deep-learning-based residual echo suppression algorithms have also demonstrated state-of-the-art performance.

In various embodiments, techniques for joint noise and echo suppression for two-way audio communication enhancement may provide an integrated approach to noise suppression and echo control which abides to the idea of incorporating prior knowledge from physics and psychoacoustics to design a low complexity but effective architecture. Since, the acoustic path between a loudspeaker and a microphone is well approximated as a linear FIR filter, the frequency domain acoustic echo canceller (AEC) described below may be implemented as well, in some embodiments. The adaptive filter may be combined with a perceptually-motivated joint noise and echo suppression technique. This technique may include restoring the spectral envelope and the periodicity of the speech as part of enhancing the captured audio data. The technique may rely upon a machine learning model trained to enhance the speech (e.g., from the AEC using the far-end signal as side information to help remove the far-end signal while denoising the near-end speech.

In various embodiments, audio data may be modeled or represented as an audio signal. For example, in some embodiments, $x(n)$ may represent a clean audio (e.g., speech signal). In various embodiments, audio signals may be captured by audio sensors, such as a hands-free microphone in a noisy room. The audio signal may be captured in a noisy environment, and the audio signal model may account for the noisy environment, such as in the scenario of the hands-free microphone given above, by representing the audio signal as $d(n)=x(n)*h_x+v(n)+z(n)$, where $v(n)$ is the additive noise from the room, $z(n)$ is the echo caused by a far-end signal, $f(n)$, $h_x$ is the impulse response from the talker to the microphone, and * denotes the convolution.

When ignoring non-linear effects, the echo signal can be expressed as z(n)=f(n)*h$_x$. Echo cancellation based on adaptive filtering consists in estimating h$_f$ and subtracting the estimated echo ẑ(n) f rom the microphone signal to produce the echo-cancelled signal y(n). Unfortunately, the echo cancellation process is generally imperfect and echo remains in y(n). For this reason, joint residual echo suppression (RES) and noise suppression (NS) may be implemented as well such that the enhanced output x̂(n) is perceptually as close as possible to the ideal clean speech x(n).

In various embodiments, the adaptive filter component to implement AEC may be derived from the SpeexDSP1 implementation of the multidelay block frequency-domain (MDF) adaptive filter algorithm. Robustness to double-talk is achieved through a combination of the learning rate control in and a two-echo-path model. Moreover, a block variant of the Proportionate Normalized Least Mean Square (PNLMS) algorithm may be used to speed up adaptation. As a compromise between complexity and convergence, a variant of AUMDF may be implemented where most blocks are alternatively constrained, but the highest-energy block is constrained on each iteration.

In some embodiments, there is sometimes an unknown delay between the signal f(n) sent to the loudspeaker and the corresponding echo appearing at the microphone. For example, in FIG. 1, near-end communication device 110 may have playback of the audio signal at speaker 114 and the echo that is captured by microphone 112. To estimate that delay D, a second AEC may be implemented with a 400-ms filter and find the peak in the estimated filter. The delay estimating AEC may operate on a down-sampled version of the signals (8 kHz) to reduce complexity. The delayed far-end signal f(n— D) to perform the final echo cancellation at 16 kHz. In some embodiments, a frame size of 10 ms may be used, which matches the frame size used in the RES and avoids causing any extra delay.

The length of the adaptive filter affects not only the complexity, but also the convergence time and the steady-state accuracy of the filter. In some embodiments, a 150-ms filter may provide a good compromise, ensuring that the echo loudness is sufficiently reduced for the RES to correctly preserve double-talk. Non-linear distortion in the echo may not be cancelled, in some embodiments.

In various embodiments, the linear AEC output y(n) contains the near-end speech x(n), the near-end noise v(n), as well as some residual echo z(n)-ẑ(n). The residual echo component includes:
   misalignment (or divergence) of the estimated filter ĥ$_f$
   non-linear distortion caused by the loudspeaker
   late reverberation beyond the impulse response of ĥ$_f$
Unlike the problem of noise suppression, residual echo suppression involves isolating a speech signal from another speech signal. Since the echo can sometimes be indistinguishable from the near-end speech, additional information is required for neural echo suppression to work reliably. While there are multiple ways to provide information about the echo, it may be that using the far-end signal f(n) is both the simplest and the most effective way. Specifically, since f(n) does not depend on the AEC behaviour, convergence problems with the echo canceller are less likely to affect the RES performance. Similarly, it may be found that using the delayed signal f(n–D) leads to slightly poorer results—most likely due to the few cases where delay estimation fails.

In various embodiments, joint echo and noise suppression may be implemented based on two main ideas:
   scaling the energy of perceptually-spaced spectral bands to match that of the near-end speech
   using a multi-tap comb filter at the pitch frequency to remove noise between harmonics and match the periodicity of the near-end speech Let $Y_b(\ell)$ be the magnitude of the AEC output signal y(n) in band b for frame $\ell$ and $X_b(\ell)$ be similarly defined for the clean speech x(n), the ideal gain that should be applied to that band is $$g_b(\ell) = \frac{X_b(\ell)}{Y_b(\ell)}$$

Applying the gain $g_b(\ell)$ to the magnitude spectrum in band b results in an enhanced signal that has the same spectral envelope as the clean speech. While this is generally sufficient for unvoiced segments, voiced segments are likely to have a higher roughness than the clean speech. This is due to noise between harmonics reducing the perceived periodicity/voicing of the speech. The noise is particularly perceptible due to the fact that tones have relatively little masking effect on noise. In that situation, a non-causal comb filter may be used to remove the noise between the pitch harmonics and make the signal more periodic. The comb filter may be controlled by strength/mixing parameters $r_b(\ell)$ where $r_b(\ell)=0$ causes no filtering to occur and $r_b(\ell)=1$ causes the band to be replaced by the comb-filtered version, maximizing periodicity. In cases where even $r_b(\ell)=1$ is insufficient to make the noise inaudible, a further attenuation $g_b^{(att)}(\ell)$ may be applied.

Figure 3A:
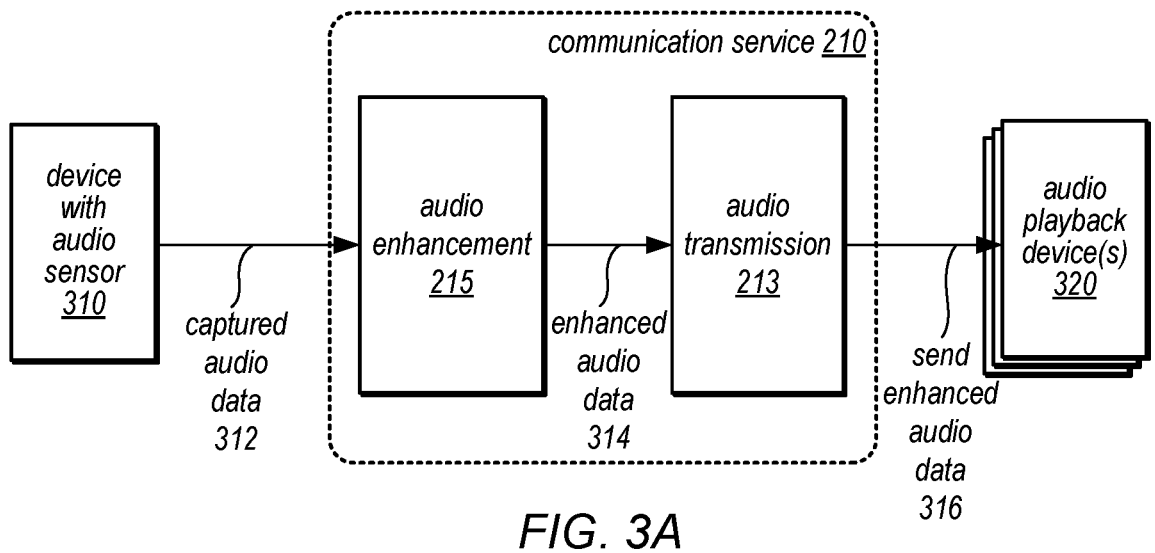
FIGS. 3A-3B illustrate logical block diagrams of different interactions of an audio sensor with provider network services, according to some embodiments.

FIG. 1 illustrates a logical block diagram of joint noise and echo suppression for two-way audio communication enhancement, according to some embodiments. Audio enhancement system 100 may be implemented as part of various network-based systems or services or stand-alone systems or devices, that receive audio data (e.g., speech audio and various background audio) and provide as output enhanced audio (e.g., removing noise and echo). For example, an audio enhancement system 100 may be implemented "service-side," as illustrated in FIG. 3A, where the communication device that captures the audio data may be separate from a service or system that implements audio enhancement system 100 (e.g., audio enhancement system 100 is separate from near-end communication device 110). In such embodiments, the audio data may be sent from the communication device (e.g., over a network connection) to the system or service for audio enhancement, as discussed below with regard to FIG. 3A. In other embodiments, audio enhancement system 100 may be implemented as part of a same communication device as the audio sensor (e.g., as part of an audio processing component or system implemented within a device that includes an audio sensor, such as a mobile phone or device, including various types of "smart" phones, "smart" loudspeakers, "smart" televisions, content delivery or audio/video streaming devices that capture audio data using microphones, and so on), as discussed below with regard to FIG. 3B.

Audio enhancement system 100 may implement various types of audio enhancement pipelines 102, such as the example of an audio enhancement pipeline(s) discussed below with regard to FIGS. 4-6. For example, audio enhancement system 100 may implement an acoustic echo canceller 104, similar to the AEC discussed above, and echo noise and suppression 106, similar to the discussion above and below with regard to FIG. 4.

Audio enhancement system 100 may be involved in a two-way communication 101, in various embodiments.

Two-communication 101 may be a fully duplex communication for audio data, between two (or more) participants on two (or more) communication devices. In some embodiments, video data may also be communicated in addition to the audio data. In the example illustrated, two-way communication is implemented between two different communication devices, near-end communication device 110 and far-end communication device 120. Each device may respectively implement sensors for capturing audio data, such as microphones 112 and 122, and loudspeakers or other playback devices for providing transmitted audio data, such as speakers 114 and 124. As noted above, echo may occur when a microphone 112 at near-end communication device 110 captures some portion of audio data transmitted from far-end communication device 120 and played via speaker 114. This "echo" audio may be reduced or eliminated according to the various techniques described with regard to audio enhancement system 100. For example, the audio data transmitted from far-end communication device 120 may also be provided to acoustic echo canceller 104 and echo and noise suppression 106 in order to recognize and suppress echo from the far-end communication device 120's transmitted audio data.

Please note that the previous descriptions of an audio enhancement system 100 enhancement is a logical illustration and thus is not to be construed as limiting as to the implementation of an audio enhancement system. For instance, audio enhancement system 100 (or a similar such system) could be implemented to enhance audio captured at far-end communication device 120 (e.g., to reduce echo from playback via speaker 124).

This specification continues with a general description of a provider network that implements multiple different services, including a communication service, which may implement joint noise and echo suppression for two-way audio communication enhancement. Then various examples of, including different components/modules, or arrangements of components/module that may be employed as part of implementing the services are discussed. A number of different methods and techniques to implement joint noise and echo suppression for two-way audio communication enhancement are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
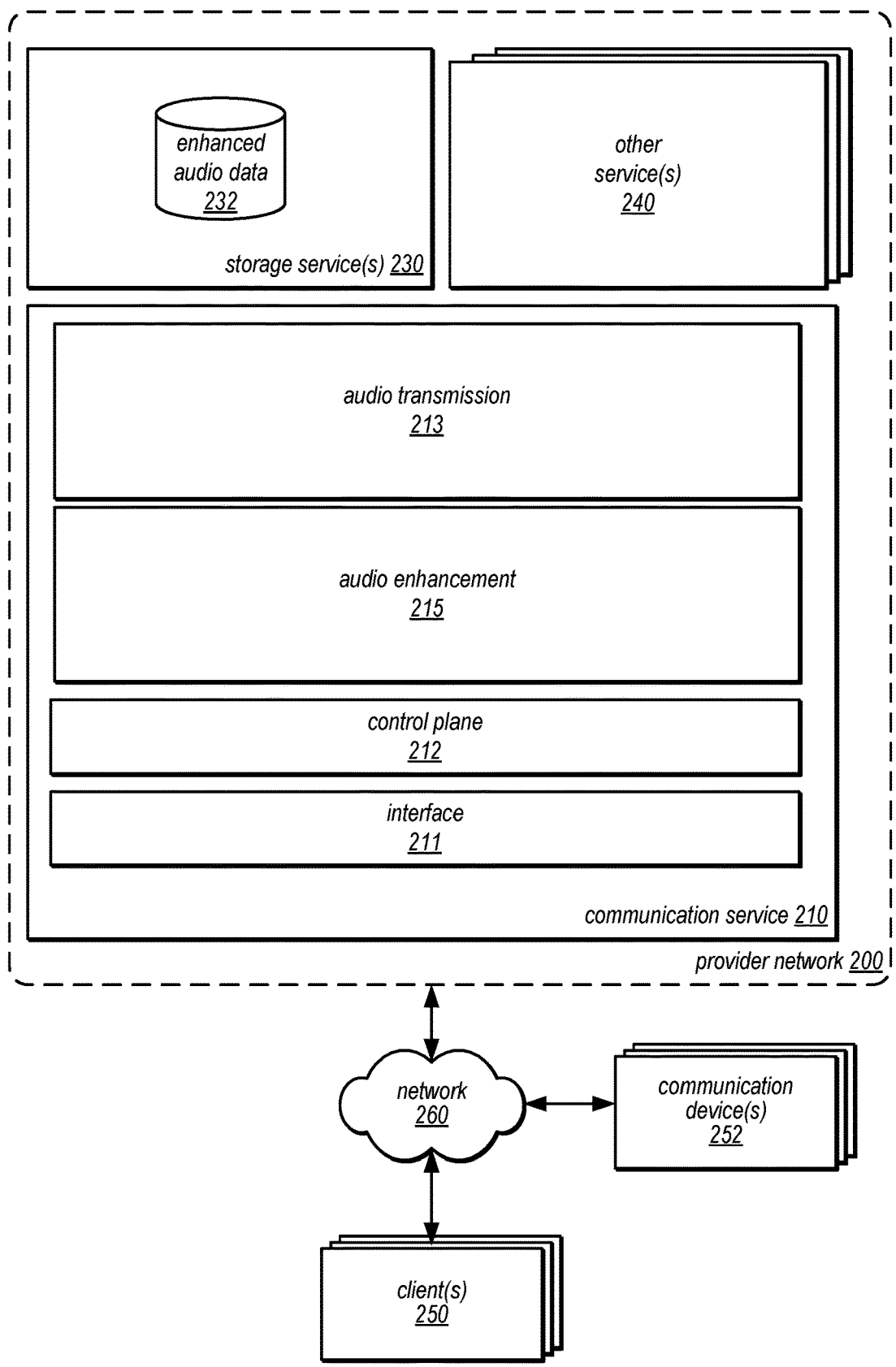
FIG. 2 illustrates an example provider network that may implement a communication service that implements of joint noise and echo suppression for two-way audio communication enhancement, according to some embodiments.

FIG. 2 illustrates an example provider network that may implement a communication service that implements joint noise and echo suppression for two-way audio communication enhancement, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and services offered by the provider network 200, in one embodiment. In some embodiments, provider network 200 may implement various computing resources or services, such as communication service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of communication service 210 may be implemented by a particular node or may be distributed across several nodes. In some embodiments, a given node may implement the functionality of more than one service system component (e.g., more than one data store component).

Communication service 210 may implement interface 211 to allow clients (e.g., client(s) 250 or clients implemented internally within provider network 200, such as a client application hosted on another provider network service like an event driven code execution service or virtual compute service) to send audio data for enhancement, storage, and/or transmission. In at least some embodiments, communication service 210 may also support the transmission of video data along with the corresponding audio data and thus may be an audio/video transmission service, which may perform the various techniques discussed above with regard to FIG. 1 and below with regard to FIGS. 3A-6 for audio data captured along with video data, in some embodiments. For example, communication service 210 may implement interface 211 (e.g., a graphical user interface, programmatic interface that implements Application Program Interfaces (APIs) and/or a command line interface) may be implemented so that a client application can submit an audio stream captured by communication device(s) 252 to be stored as enhanced audio data 232 stored in storage service(s) 230, or other storage locations or resources within provider network 200 or external to provider network 200 (e.g., on premise data storage in private networks). Interface 211 may allow a client to cause audio enhancement using the techniques discussed above with regard to FIG. 1 and below with regard to FIGS. 3A-6, (e.g., as part of audio transmission, such as voice transmission like Voice over IP (VoIP).

Communication service 210 may implement a control plane 212 to perform various control operations to implement the features of communication service 210. For example, control plane 212 may monitor the health and performance of requests at different components audio-transmission 213 and audio enhancement 215 (e.g., the health or performance of various nodes implementing these features of communication service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available node to begin work on the request.

Figure 3B:
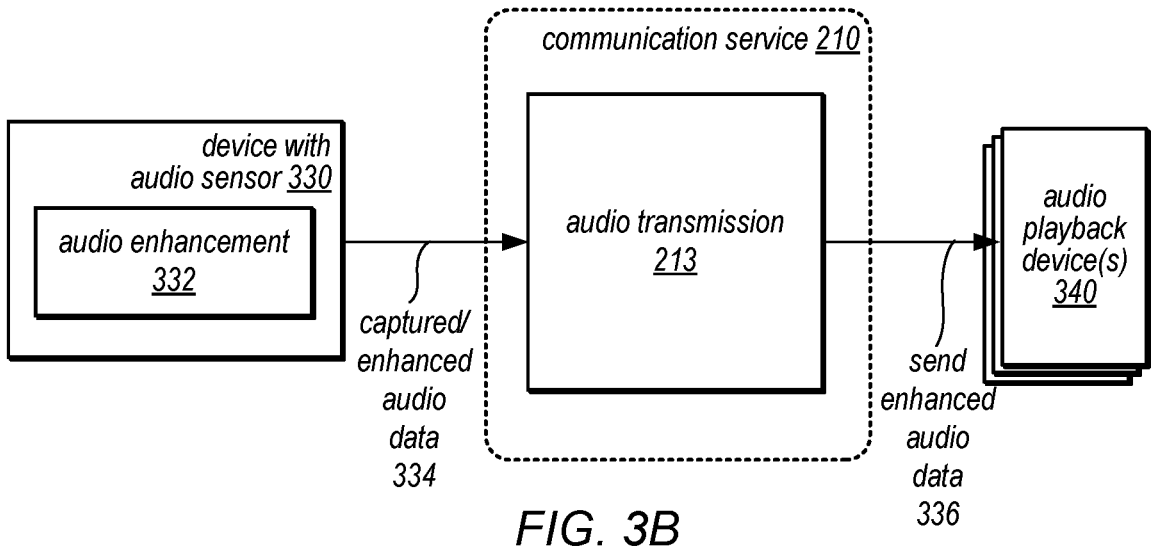

Communication service 210 may implement audio-transmission 213, which may facilitate audio communications (e.g., for audio-only, video, or other speech communications), speech commands or speech recordings, or various other audio transmissions, as discussed in the examples below with regard to FIGS. 3A and 3B. Communication service 210 may implement audio enhancement 215 to provide an audio enhancement system (e.g., like audio enhancement system 100 in FIG. 1), which may implement audio enhancement pipelines, like those discussed below with regard to FIGS. 4-5 and techniques like those discussed below with regard to FIG. 6.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. Data storage service(s) 230 may be accessed via programmatic interfaces (e.g., APIs) or graphical user interfaces. Enhanced audio 232 may be put and/or retrieved from data storage service(s) 230 via an interface for data storage services 230, in some embodiments.

Generally speaking, clients 250 may encompass any type of client that can submit network-based requests to provider network 200 via network 260, including requests for communication service 210 (e.g., a request to enhance, transmit, and/or store audio data). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other application that may make use of communication service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like communication service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Communication device(s) 252, may implement microphones that may, in various embodiments, collect, capture, and/or report various kinds of audio data, (or audio data as part of other captured data like video data). Communication device(s) 252 may be as various mobile or other communication and/or playback devices, such as microphones embedded in "smart-speaker" or other voice command-enabled devices. In some embodiments, some or all of audio enhancement techniques may be implemented as part of devices that include sensors 252 before transmission of enhanced audio to communication service 210, as discussed below with regard to FIG. 3B.

As discussed above, different interactions between sensors that capture audio data and services of a provider network 200 may invoke audio enhancement, in some embodiments. FIGS. 3A-3B illustrate logical block diagrams of different interactions of an audio sensor with provider network services, according to some embodiments. In FIG. 3A, audio sensor 310 may capture audio data from various environments, including speech audio from noisy environments as discussed above with regard to FIG. 1. Device with audio sensor 310 may send directly captured audio data 312 to communication service 210, in some embodiments, via an interface for communication service 210 (e.g., interface 211), such as by sending captured audio data 312 over wired or wireless network connection to communication service 210. In some embodiments, device with audio sensor 310 may provide the captured audio data to another device that sends the capture audio data 312 to communication service (not illustrated). Capture audio data may be transmitted as an audio file or object, or as a stream of audio, in some embodiments. For instance, for live communications, such as a VoIP call, captured audio data 312 may be a stream of audio data.

Communication service 210 may process captured audio data 312 through audio enhancement 215, in various embodiments. For example, an audio enhancement pipeline like those discussed below with regard to FIG. 4 may be implemented to provide enhanced audio data 314, including enhanced audio data with residual echo suppression joint with noise suppression as discussed above with regard to FIG. 1 and below with regard to FIGS. 4 and 6. Audio transmission 213 may receive the enhanced audio data 314, identify one or more destinations for the enhanced audio, such as one or more audio playback devices 320, and send the enhanced audio data 316 to one or more audio playback devices 320, in some embodiments. For example, a two-communication between may include more than two participants using more than two communication devices, there the enhanced audio signal may be broadcast or otherwise transmitted to multiple recipient devices. Given the improvements to audio quality provided by audio enhancement, including the reduction of residual echo, audio playback device 320 may play the enhanced audio data 316 to one or more listeners (e.g., which may benefit from the improvements to the captured audio data in the form of more clear and perceptible speech).

Audio enhancement systems may also be implemented separately from communication service 210, in some embodiments. For example, as illustrated in FIG. 3B, device with audio sensor 330 may also implement audio enhancement 332, which may be an audio enhancement pipeline like those discussed below with regard to FIG. 4 may be implemented to provide enhanced audio data 334, including enhanced audio data with joint noise and echo suppression as discussed above with regard to FIG. 1 and below with regard to FIGS. 4 and 6. Audio enhancement 332 may be implemented as part of other pre-transmission processing implemented by device with audio sensor 330, such as various encryption, compression, or other operations performed on capture audio data prior to transmission to communication service 210.

Device with audio sensor 330 may then send the capture/enhanced audio data 334 to communication service 210 for transmission (e.g., via interface 211), in some embodiments. Audio transmission 213 may receive the enhanced audio data 334, identify one or more destinations for the enhanced audio, such as one or more audio playback devices 340, and send the enhanced audio data 336 to audio playback device 340, in some embodiments.

Figure 4:
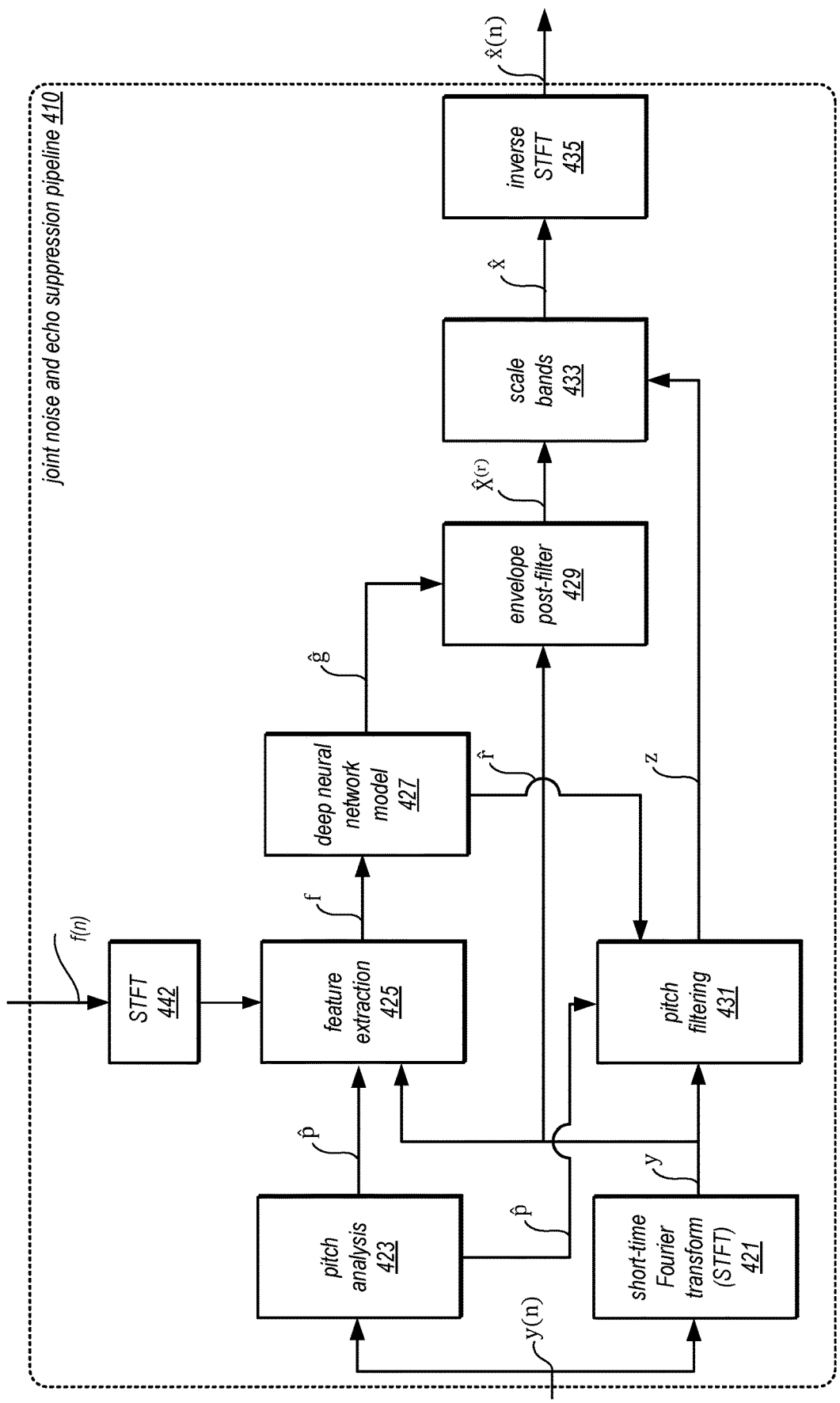
FIG. 4 illustrates a logical block diagram of an example audio enhancement pipeline that may implement of joint noise and echo suppression for two-way audio communication enhancement, according to some embodiments.
Figure 5:
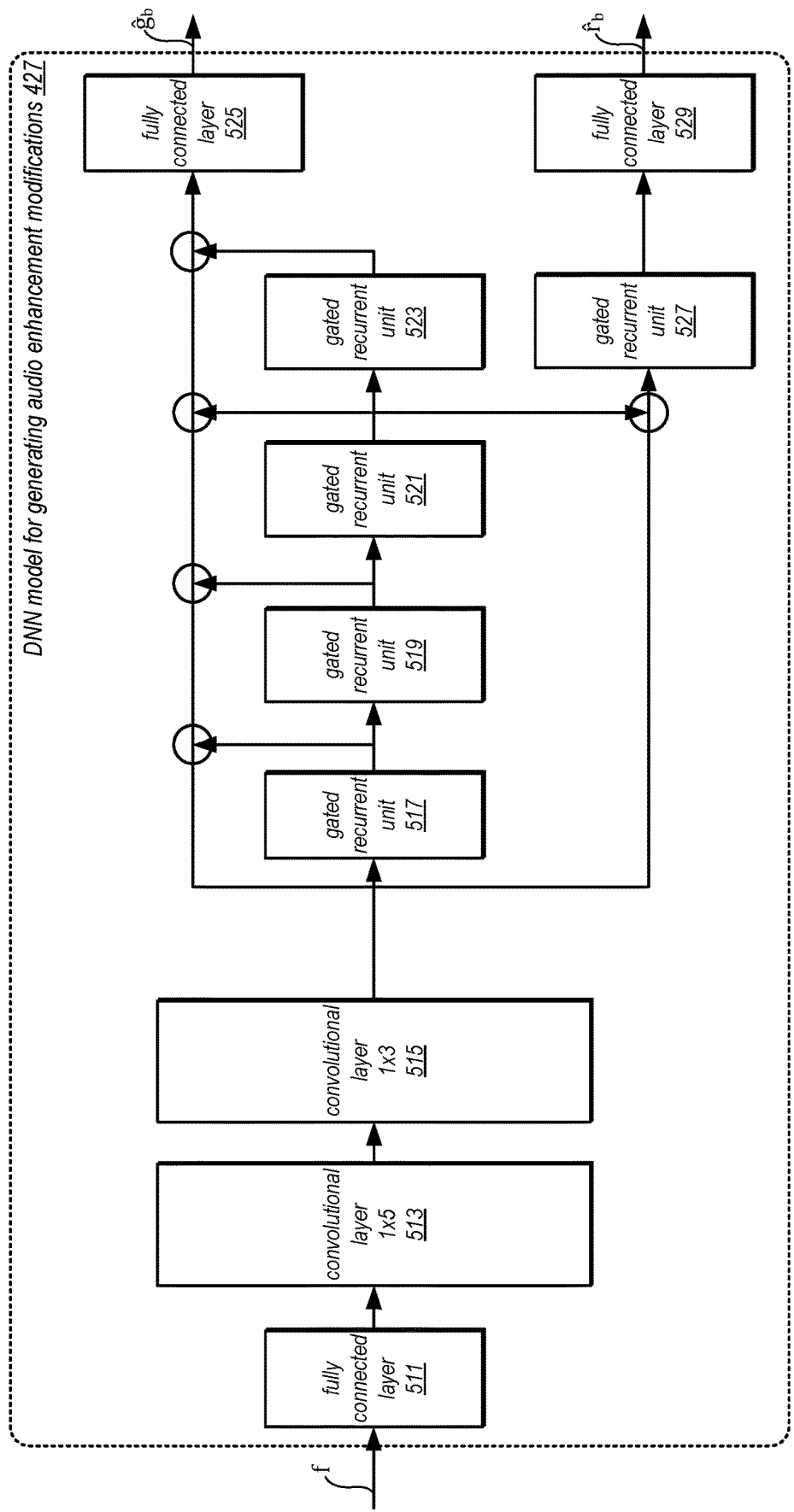
FIG. 5 illustrates a logical block diagram for a machine learning model that determines modifications to enhance speaker audio data within audio data, according to some embodiments.

FIG. 4 illustrates a logical block diagram of an example audio enhancement pipeline that may implement joint noise and echo suppression for two-way audio communication enhancement, according to some embodiments. Although not depicted in FIG. 4, an acoustic echo cancellation technique similar to that discussed above may be implemented on the received audio data signal y(n) which may have been captured by a microphone. In other embodiments, no acoustic echo cancellation technique may be performed prior to the joint noise and echo suppression pipeline.

As discussed above, received audio data may be represented as audio signal y(n). Audio enhancement pipeline 410 may implement STFT 421 to determine different spectrum bands. STFT 421 may provide these spectrum bands y to feature extraction stage 425, pitch filtering stage 431 and envelope post-filter 429, in some embodiments. Audio enhancement pipeline 410 may also implement pitch analysis stage 423, in some embodiments. Pitch analysis 423 may, in some embodiments, provide an approximation $\hat{p}(n)$ of a perfect periodic component p(n) from clean speech, in some embodiments, which may be provided to both feature extraction 425 and pitch filtering 425.

Feature extraction 425 may provide a feature set f for determining the ideal ratio mask of spectrum bands at deep neural network (DNN) model 427. As part of the feature set, the far-end signal f(n) may be used as a reference signal, passed through STFT 442 to be provided to feature extraction 425 and included in the feature set f. Although not illustrated in FIG. 4, in some embodiments, far-end signal f(n) may include multiple channels (e.g., two channels for stereo playback). In some embodiments, techniques to combine these multiple channels may be performed before feature extraction. For example, the multiple channels can be averaged as part of a downmixing technique. In another example embodiment, the multiple channels can be concatenated, such that each channel provides its own respective portion of the input features to deep neural network model 427.

Deep neural network model 427 may generate ideal ratio masks, which are provided as $\hat{g}$ to envelope post-filter 429, as discussed in detail below with regard to FIG. 5. Envelope post-filter 429 may modify the gain values of $\hat{g}$ for the different spectrum bands according to the gain values themselves (e.g., by multiplying the gain values according to a monotonically increasing function (e.g., with values from 0 to 1) that takes, as input the respective gain value). A global gain value may also be applied, in some embodiments.

The filtered audio signal $\hat{X}^{(r)}$ may be provided to scale bands 433, in some embodiments. Scale bands 433 may also, in some embodiments, use the output z of pitch filtering 431. Pitch filtering 431 may, in some embodiments, reconstruct the harmonic properties of clean speech by applying comb filtering based on pitch frequency. Inverse STFT 435 may regenerate the audio signal 2 from scale bands 433 to generate $\hat{x}(n)$, in some embodiments.

Various types of machine learning models may be implemented to determine the modifications to enhance speaker audio within audio data. For example, deep neural networks, like an RNN as discussed above, may be used. FIG. 5 illustrates a logical block diagram for a machine learning model that determines modifications to enhance speaker audio data within audio data, according to some embodiments.

DNN model 427 may receive features f as discussed above with regard to FIG. 4 at a 128 fully connected layer 511, which may then pass to two convolutional layers, a 512, 1×5 convolutional layer 513 followed by a 512, 1×3 convolutional layer 515. A 34 fully connected layer 525 that outputs the gain values $\hat{g}_b$ and a 128 gated recurrent unit 527 and fully connected layer 529 that outputs $\hat{r}_b$, as shown in FIG. 5. In other embodiments, concatenation may occur at other location(s) in addition to or instead of the location indicated at 516.

As discussed above, the model 427 uses two convolutional layers (a 1×5 layer followed by a 1×3 layer), and five GRU layers, as shown in FIG. 4. The convolutional layers are aligned in time such as to use up to M frames into the future. The input features used by the model are tied to the 32 bands used. For each band, three features are used:

the energy in the band with look-ahead $Y_b(\ell+M)$ the pitch coherence without lookahead $q_{y,b}(\ell)$ ((the coherence estimation itself uses the full look-ahead)

the energy of the far-end band with look-ahead $F_b(\ell+M)$

In addition to those 96 band-related features, four extra scalar features may be used (for a total of 100 input features):

the pitch period T ($\ell$)

an estimate of the pitch correlation with look-ahead, a non-stationarity estimate, and the ratio of the $L_1$-norm to the $L_2$ norm of the excitation computed from y(n)

For each band b, there may be 2 outputs: the gain $\hat{g}_b(\ell)$ approximates $g_b^{(att)}(\ell)g_b(\ell)$ and the strength $\hat{r}_b(\ell)$ approximates $r_b(\ell)$.

The 8M weights of the model may be forced to a ±½ range and quantized to 8-bit integers, in some embodiments. This reduces the memory requirement (and bandwidth), while also reducing the computational complexity of the inference by taking advantage of vectorization.

In some situations, it is desirable to further reduce the complexity of the model. While it is always possible to reduce the number of units in each layer, it has recently been found that using sparse weight matrices (i.e. sparse network connections) can lead to better results. Since modern CPUs make heavy use of single instruction, multiple data (SIMD) hardware, it is important for the algorithm to allow vectorization. For that reason, structured sparsity may be used—where whole sub-blocks of matrices are chosen to be either zero or non-zero. For example, 16×4 sub-blocks could be chosen. All fully-connected layers as well as the first convolutional layer may be kept dense (no sparsity). The second convolutional layer may be 50% dense, and the GRUs use different levels of sparsity for the different gates. The matrices that compute the new state may have a density of 40%, whereas the update gate matrices may be 20% dense and the reset gate matrices may have only 10% density. This reflects the unequal usefulness of the different gates on recurrent units.

In view the example values noted above, the resulting sparse model has 2.1M non-zero weights, or 25% of the size of the full model. An even lower complexity model with the same density may be implemented but have layers limited to 256 units, resulting in 800 k non-zero weights, or 10% of the full model size. These different complexities may support the use of different versions of the machine learning model, allowing initialization or other techniques to intelligently select the version of the machine learning model best suited to the capabilities of the device executing the machine learning model as part of audio enhancement.

The following describes an example technique for training DNN model 427, according to some embodiments. The model 427 may be trained on synthetic mixtures of clean speech, noise and echo that attempt to recreate real-world conditions, including reverberation. The signal-to-noise ratio (SNR) may be varied from −15 dB to 45 dB (with some noise-free examples included), and the echo-to-near-end ratio is between −15 dB and dB. 120 hours of clean speech data may be used along with 80 hours of various noise types. Most of the data is sampled at 48 kHz, but some of it—including the far-end single-talk data—may be sampled at 16 kHz. Both synthetic and real room impulse responses may be used for the augmentation process.

In typical conditions, the effect of the room acoustics on the near-end speech, the echo, and the noise is similar, but not identical. This is due to the fact that while all three occur in the same room (same RT60), they can be in different locations and—especially— at different distances. For that reason, only one room impulse response for each condition may be picked, but scale the early reflections (first 20 ms) with a gain varying between 0.5 and 1.5 to simulate the distance changing, in some embodiments. The target signal includes the early reflections as well as an attenuated echo tail (with RT60=200 ms) so that late reverberation is attenuated to match the acoustics of a small room.

The generalization of the model may be improved by using various filtering augmentation methods. That includes applying a low-pass filter with a random cutoff frequency, making it possible to use the same model on narrowband to fullband audio.

In various embodiments, a loss function for the gain attempts to match human perception as closely as possible. The following loss function is an example of training the machine learning model for the gain estimations:

$$\mathcal{L}_g = \sum_b \mathcal{D}(g_b, \hat{g}_b) + \lambda 4 \sum_b [D(g_b, \hat{g}_b)]^2$$

with the distortion function:

$$\mathcal{D}(g_b, \hat{g}_b) = \frac{(g_b^{2\gamma} - \hat{g}_b^{2\gamma})^2}{\max(g_b^{2\gamma} - \hat{g}_b^{2\gamma}) + \epsilon}$$

where γ=0.3 is the generally agreed-upon exponent to convert acoustic power to the sone scale for perceived loudness. The purpose of the denominator is to over-emphasize the loss when completely attenuating speech or when letting through small amounts of noise/echo during silence. κ4=10 may be used for the second term, an L4 term that over-emphasizes large errors in general.

Although FIGS. 2-5 have been described and illustrated in the context of a provider network implementing a communication service, the various components illustrated and described in FIGS. 2-5 may be easily applied to other systems that implement audio enhancement for two-way audio communications. As such, FIGS. 2-5 are not intended to be limiting as to other embodiments of ratio mask post-filtering for audio enhancement.

Figure 6:
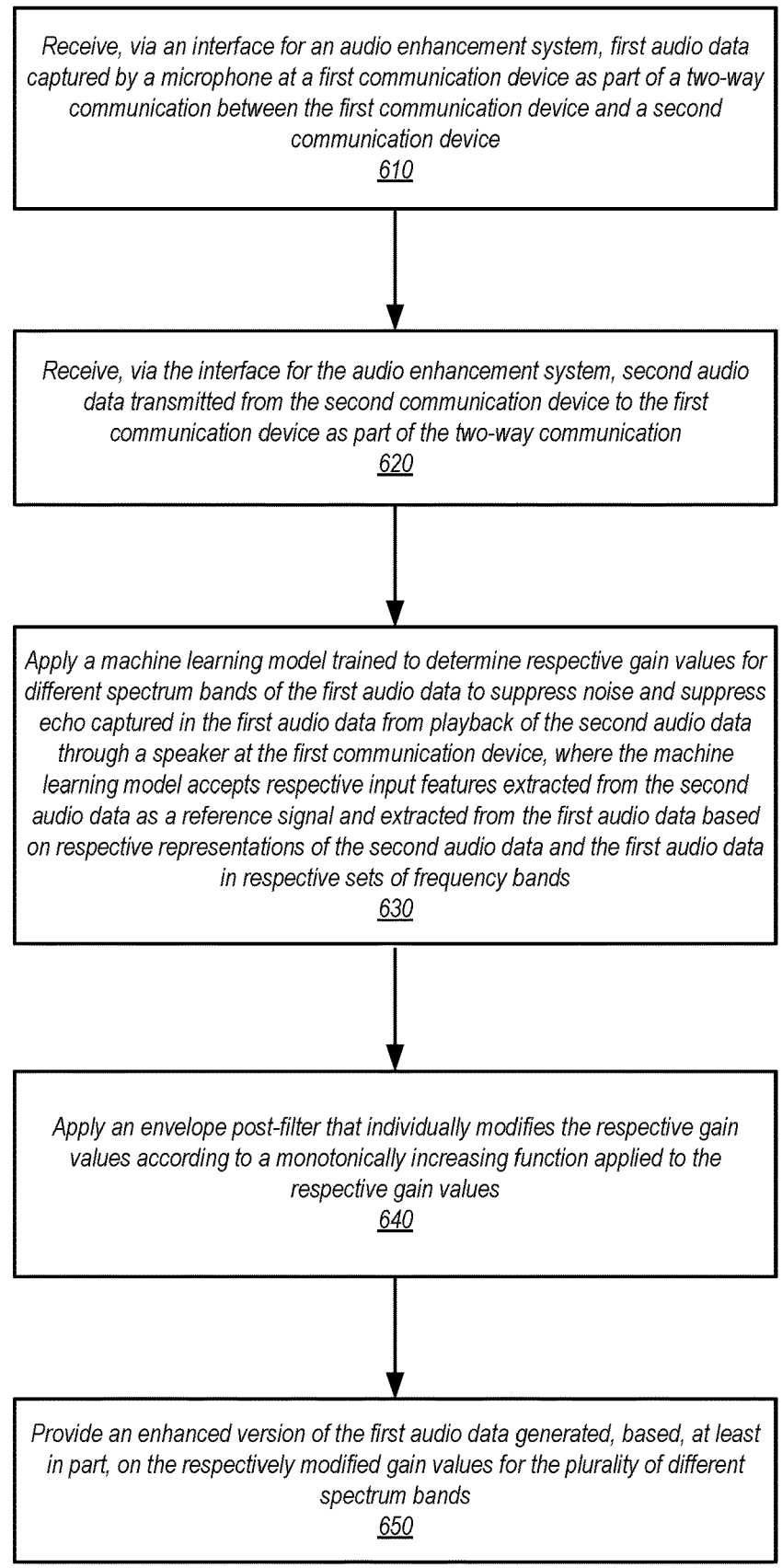
FIG. 6 illustrates a high-level flowchart of various methods and techniques to implement of joint noise and echo suppression for two-way audio communication enhancement, according to some embodiments.

FIG. 6 illustrates a high-level flowchart of various methods and techniques to implement of joint noise and echo suppression for two-way audio communication enhancement, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, first audio data may be received (e.g., near audio data) captured by a micro phone at a first communication device as part of a two-way communication between the first communication device and a second communication device via an interface for an audio enhancement system. As discussed in detail above, the first audio data may be received at an audio enhancement system, implemented as part of a communication device, such as a near-end communication device 110 in FIG. 1 above or as part of a service, as discussed above with regard to FIG. 2). The interface of the audio enhancement system may be a programmatic interface (e.g., capable of receiving the first audio data via an API call or request to enhance given audio data).

As indicated at 620, second audio data (e.g., far-end audio data) transmitted from the second communication device to the first communication device as part of the two-way communication may be received via the interface for the audio enhancement system, in some embodiments. As discussed above with regard to FIG. 4, in some embodiments, the second audio data may include multiple channels for playback (e.g., in stereo). In some embodiments, these channels may be combined (e.g., using averaging or concatenation) in order to use the combined channels as the reference signal for joint noise and echo suppression, as discussed below.

As indicated at 630, a machine learning model trained to determine respective gain values for different spectrum bands of the first audio data to suppress noise and suppress echo captured in the first audio data from playback at the second audio data through a speaker at the first communication device may be applied. The machine learning model may use respective input features extracted from the second audio data as a reference signal and extracted from the first audio data. The first audio data and the second audio data may be represented in sets of frequency bands. For example, the frequency bands may be psychoacoustically-based, such as critical bands or equivalent rectangular bandwidth (ERB). In some embodiments, these representations may be in the same frequency scale, such as in a same equivalent rectangular bandwidth scale.

As indicated at 640, an envelope post-filter may be applied that individually modifies the respective gain values according to a monotonically increasing function applied to the respective gain values, in some embodiments, as discussed in detail above with regard to FIG. 4. As indicated at 650, an enhanced version of the first audio data generated based, at least in part, on the respectively modified gain values for the plurality of different spectrum bands may be provided, in various embodiments. For example, the enhanced version may be sent to one (or more) recipient communication devices in the two-way communication and/or stored. For example, the enhanced version of the first audio data may be sent to the second communication device for playback through a speaker at the second communication device.

In some embodiments, an initialization process may be performed at the device, system, or service implementing the above techniques to determine a size or version of the machine learning model to use based on the computational capacity of the devices, system, or service. For example, a mapping of various computational capabilities may be mapped to different versions of the machine learning model in order to select the corresponding version.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
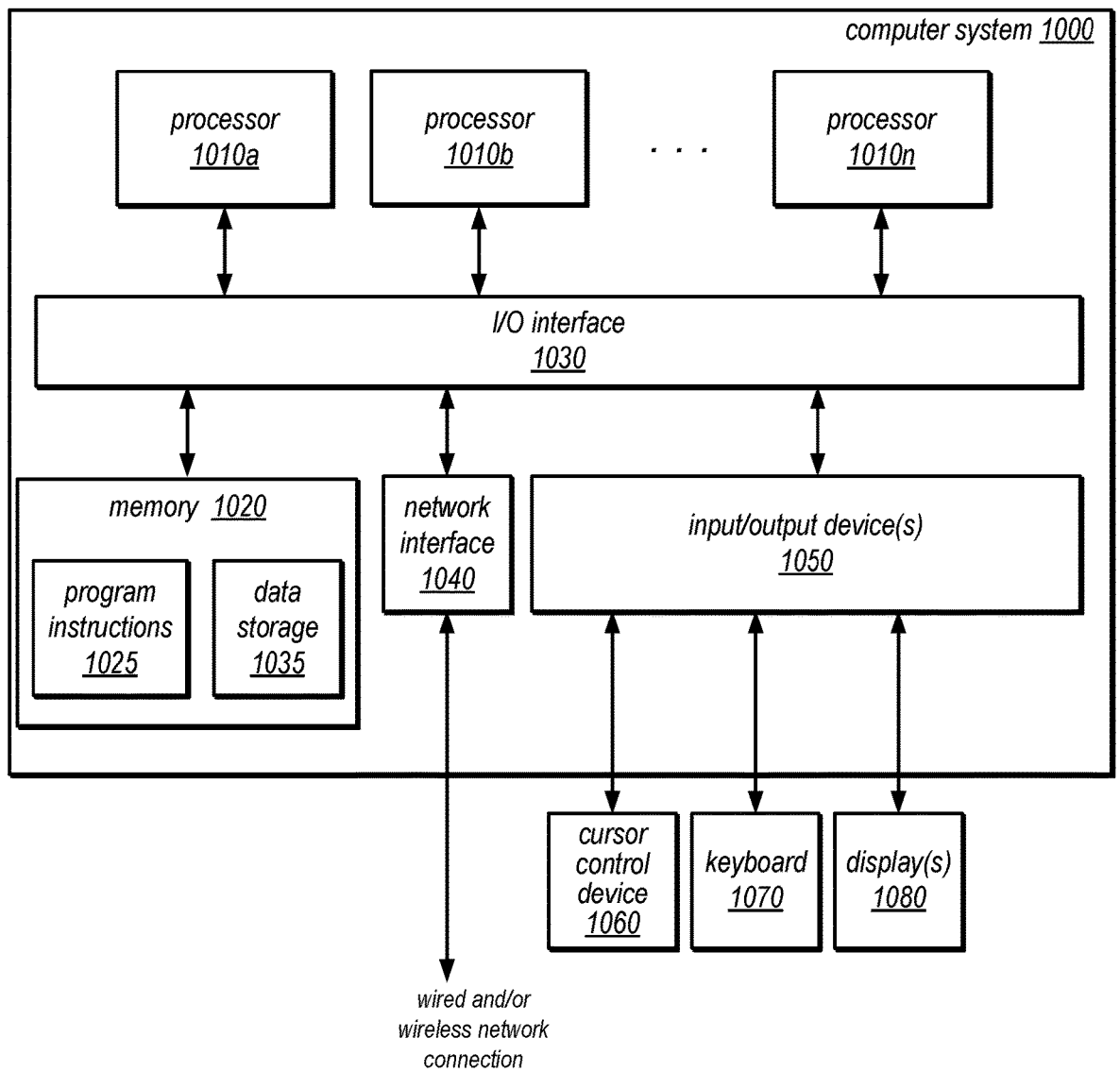
FIG. 7 illustrates an example system to implement the various methods, techniques, and systems described herein, according to some embodiments.

Embodiments of joint noise and echo suppression for two-way audio communication enhancement, according to some embodiments as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/ output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques as described herein, including the application of self-supervised training for audio anomaly detection and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement an audio enhancement system, configured to:
   receive, via an interface for the audio enhancement system, first audio data captured by a microphone at a first communication device as part of a two-way audio communication between the first communication device and a second communication device;
   receive second audio data transmitted from the second communication device to the first communication device for playback through a speaker at the first communication device as part of the two-way audio communication;
   apply a machine learning model trained to determine respective gain values for a plurality of different spectrum bands of the first audio data to suppress noise and suppress echo captured in the first audio data from playback of the second audio data through a speaker at the first communication device, wherein the machine learning model accepts respective input features extracted from the second audio data as a reference signal and extracted from the first audio data based on respective representations of the second audio data and the first audio data in respective sets of frequency bands; and
   apply an envelope post-filter that individually modifies the respective gain values according to a monotonically increasing function applied to the respective gain values;
   perform an inverse transform on the plurality of different spectrum bands with the respectively modified gain values to generate an enhanced version of the first audio data; and
   send the enhanced version of the first audio data to the second communication device for playback at the second communication device.

2. The system of claim 1, wherein the audio enhancement system is further configured to apply an acoustic echo canceller to the first audio data prior to providing the first audio data as the input features to the machine learning model.

3. The system of claim 1, wherein the system is implemented as part of the first communication device, and wherein the enhanced version of the first audio data is sent to the second communication device via a communication service implemented as part of a provider network that transmits the enhanced version of the first audio data to the second communication device over a network connection.

4. The system of claim 1, wherein the audio enhancement system is implemented as part of a communication service offered as part of a provider network, and wherein the enhanced version of the first audio data is sent to the second communication device over a network connection between the communication service and the second communication device.

5. A method, comprising:
   receiving, via an interface for an audio enhancement system, first audio data captured by a microphone at a first communication device as part of a two-way communication between the first communication device and a second communication device;
   receiving, via the interface for the audio enhancement system, second audio data transmitted from the second communication device to the first communication device as part of the two-way communication;
   applying, by the audio enhancement system, a machine learning model trained to determine respective gain values for a plurality of different spectrum bands of the first audio data to suppress noise and suppress echo captured in the first audio data from playback of the second audio data through a speaker at the first communication device, wherein the machine learning model accepts respective input features extracted from the second audio data as a reference signal and extracted from the first audio data based on respective representations of the second audio data and the first audio data in respective sets of frequency bands; and
   applying, by the audio enhancement system, an envelope post-filter that individually modifies the respective gain values according to a monotonically increasing function applied to the respective gain values; and
   providing, by the audio enhancement system, an enhanced version of the first audio data generated, based, at least in part, on the respectively modified gain values for the plurality of different spectrum bands.

6. The method of claim 5, further comprising applying an acoustic echo canceller to the first audio data prior to providing the first audio data as the input features to the machine learning model.

7. The method of claim 5, wherein the second audio data comprises two or more channels for playback through the speaker and wherein the two or more channels of the second audio data are combined as the reference signal.

8. The method of claim 5, wherein the two or more channels are combined through a downmixing technique that averages the two or more channels.

9. The method of claim 5, further comprising selecting, by the audio enhancement system, a version of the machine learning model out of a plurality of versions of the machine learning model to apply based, at least in part, on a computational capacity of the audio enhancement system, as part of initializing the audio enhancement system.

10. The method of claim 5, wherein the audio enhancement system is implemented as part of a communication service offered as part of a provider network, and wherein the enhanced version of the first audio data is sent to the second communication device over a network connection between the communication service and the second communication device.

11. The method of claim 5, wherein the audio enhancement system is implemented as part of the first communication device, and wherein the enhanced version of the first audio data is sent to the second communication device via a communication service implemented as part of a provider network that transmits the enhanced version of the first audio data to the second communication device over a network connection.

12. The method of claim 5, wherein the two-way communication is a video communication, wherein the first audio data and the second audio data is captured along with corresponding two-way video data.

13. One or more non-transitory, computer-readable storage media, storing program instructions that when executed on or across one or more computing devices cause the one or more computing devices to implement:
- receiving, via an interface for an audio enhancement system, first audio data captured by a microphone at a first communication device as part of a two-way communication between the first communication device and a second communication device;
- receiving, via the interface for the audio enhancement system, second audio data transmitted from the second communication device to the first communication device as part of the two-way communication;
- applying, by the audio enhancement system, a machine learning model trained to determine respective gain values for a plurality of different spectrum bands of the first audio data to suppress noise and suppress echo captured in the first audio data from playback of the second audio data through a speaker at the first communication device, wherein the machine learning model accepts as respective input features the second audio data as a reference signal and the first audio data based on respective representations of the second audio data and the first audio data in respective sets of frequency bands; and
- applying, by the audio enhancement system, an envelope post-filter that individually modifies the respective gain values according to a monotonically increasing function applied to the respective gain values; and
- performing, by the audio enhancement system, an inverse transform on the plurality of different spectrum bands with the respectively modified gain values to generate an enhanced version of the first audio data.

14. The one or more non-transitory, computer-readable storage media of claim 13, storing further program instructions that when executed by the one or more computing devices, cause the one or more computing devices to further implement applying, by the audio enhancement system, an acoustic echo canceller to the first audio data prior to providing the first audio data as the input features to the machine learning model.

15. The one or more non-transitory, computer-readable storage media of claim 13, wherein the second audio data comprises two or more channels for playback through the speaker and wherein the two or more channels of the second audio data are combined as the reference signal.

16. The one or more non-transitory, computer-readable storage media of claim 15, wherein the two or more channels are combined by concatenating the two or more channels.

17. The one or more non-transitory, computer-readable storage media of claim 13, wherein the respective sets of frequency bands are psychoacoustically-based bands.

18. The one or more non-transitory, computer-readable storage media of claim 17, wherein the respective sets of frequency bands that are psychoacoustically-based bands are in a same equivalent rectangular bandwidth scale.

19. The one or more non-transitory, computer-readable storage media of claim 13, wherein the audio enhancement system is implemented as part of a communication service offered as part of a provider network, and wherein the enhanced version of the first audio data is sent to the second communication device over a network connection between the communication service and the second communication device.

20. The one or more non-transitory, computer-readable storage media of claim 13, wherein the two-way communication is a video communication, wherein the first audio data and the second audio data is captured along with corresponding two-way video data.

* * * * *